(12) United States Patent
Stobbe et al.

(10) Patent No.: US 8,556,182 B2
(45) Date of Patent: Oct. 15, 2013

(54) CARD DATA STORAGE DEVICE WITH DETECTOR PLATE

(75) Inventors: Anatoli Stobbe, Barsinghausen (DE); Werner Knop, Wennigsen (DE)

(73) Assignee: Astra Gesellschaft fur Asset Management mbH & Co. KG, Barsinghausen (DE)

( * ) Notice: Subject to any disclaimer, the term of this patent is extended or adjusted under 35 U.S.C. 154(b) by 867 days.

(21) Appl. No.: 12/214,099

(22) Filed: Jun. 17, 2008

(65) Prior Publication Data

US 2008/0314982 A1    Dec. 25, 2008

(30) Foreign Application Priority Data

Jun. 21, 2007    (DE) .......................... 10 2007 029 083

(51) Int. Cl.
*G06K 19/00*    (2006.01)
(52) U.S. Cl.
USPC ........... 235/487; 235/492; 235/435; 235/439; 235/451
(58) Field of Classification Search
USPC .......................... 235/435, 439, 451, 487, 492
See application file for complete search history.

(56) References Cited

U.S. PATENT DOCUMENTS

| 5,444,222 | A | * | 8/1995 | Inoue ............................ 235/380 |
| 5,852,289 | A | * | 12/1998 | Masahiko ..................... 235/492 |
| 6,378,774 | B1 | * | 4/2002 | Emori et al. .................. 235/492 |
| 6,950,023 | B1 | | 9/2005 | Martin |
| 6,975,834 | B1 | | 12/2005 | Forster |
| 2003/0222755 | A1 | * | 12/2003 | Kemper et al. .............. 340/5.61 |
| 2005/0093677 | A1 | | 5/2005 | Forster et al. |
| 2006/0244676 | A1 | * | 11/2006 | Uesaka ........................ 343/895 |
| 2007/0210923 | A1 | * | 9/2007 | Butler et al. ............... 340/572.8 |

FOREIGN PATENT DOCUMENTS

| DE | 601 19 755 | 5/2007 |
| FR | 2 814 574 | 3/2002 |
| JP | 2005234607 | 9/2005 |
| WO | WO 2004/055721 | 7/2004 |

* cited by examiner

*Primary Examiner* — Michael G Lee
*Assistant Examiner* — Matthew Mikels
(74) *Attorney, Agent, or Firm* — Collard & Roe, P.C.

(57) ABSTRACT

A card data storage device with detector plate is described. The detector plate consists of a chip and a coupling loop inductively linked with the chip, wherein the coupling loop completely or partially surrounds an electrically non-conducting region of the card data storage device.

2 Claims, 3 Drawing Sheets

CARD DATA STORAGE DEVICE WITH DETECTOR PLATE

CROSS REFERENCE TO RELATED APPLICATIONS

Figure 1:
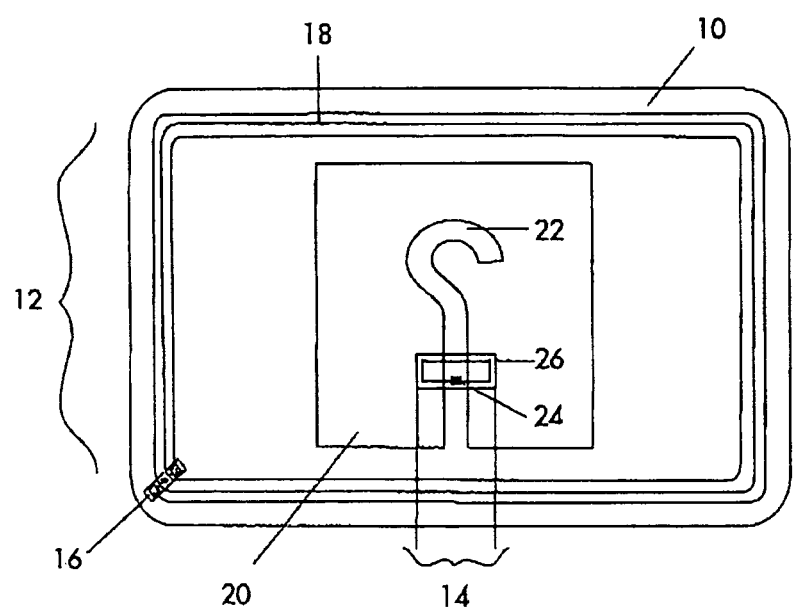

Applicants claim priority under 35 U.S.C. §119 of German Application No. 10 2007 029 083.9 filed Jun. 21, 2007.

The invention concerns a card data storage device with a detector plate according to the preamble of claim 1.

Card data storage devices are of known art as identification, authorisation and access data storage devices and comprise one or a plurality of data stores on a plastic card in the credit card format. The credit card format has in recent times achieved worldwide acceptance as a uniform size, since it is easy to manipulate, allows a visible reproduction of important information, can be consistently worn on the person in visible storage pockets, and can also be stowed in the usual storage compartments in briefcases and purses.

While data stores have previously been embodied as magnetic strips and/or contacted storage chips, in recent times remotely readable, radio-supported detector plates have also appeared that can transfer their information via an electromagnetic field. Such detector plates consist of a chip and at least one antenna.

Radio-supported detector plates are authorised in the LF band, HF band and VHF band. On account of the credit card format antennae for these detector plates can only be implemented as magnetic antennae in the LF band, and in the HF band as magnetic antennae or greatly shortened electrical antennae as required. In the VHF band there exists the option of implementing antennae as magnetic antennae and/or only slightly shortened electrical antennae.

Detector plates in the VHF band offer very rapid data transfer compared with detector plates in the other frequency bands, so that when combined with the use of an anti-collision method for differentiating between a plurality of detector plates located in the reading field at the same time only slight reading delays occur. In addition the advantage exists as required to limit the reading range greatly through the exclusive use of a magnetic antenna, or to achieve a reading range on credit cards using an electrical antenna, only slightly shortened or not shortened at all, that is very long in comparison to that achieved using LF detector plates or HF detector plates.

The object of the invention for radio-supported detector plates in the VHF band or above is to create the prerequisites for settings of shorter or longer reading ranges as required.

This object is achieved with a card data storage device with a detector plate according to the preamble of claim 1 by means of the features of this claim.

Further developments and advantageous embodiments ensue from the dependent claims.

The invention is based on the consideration that with a detector plate comprising a chip and a magnetic antenna the magnetic components of the electromagnetic alternating field prevail in the near field, therefore the dispersion of the alternating electromagnetic field as a result of metallic objects in the near field is less impaired than is the case when using an antenna that preferentially radiates the electrical components, and that the reading range is limited as a protection against any eavesdropping on stored data. However, the use of the same magnetic antenna as an inductive coupling loop offers also the option of being coupled permanently or as required with an amplifier antenna, in order to increase the reading range significantly, either fundamentally, or as required.

The detector plate can be arranged on a plastic film that is adhesively bonded to the card data storage device.

In this manner an existing card data storage device can be fitted according to the invention without any intervention in the manufacturing process of the latter and without impairment of the usual utilisation of the latter. Thereby the detector plate can be so arranged that it either uses existing antenna structures of other detector plates, or is decoupled from other detector plates, or from other electrically conducting structures.

The coupling loop of the detector plate can be coupled with an amplifier antenna. The coupling can be embodied inductively or capacitatively.

Via the coupling with an amplifier antenna, which forms a component that acts purely passively, the reading range of the detector plate can be significantly increased.

The amplifier antenna can be designed as an electrical antenna.

With an electrical antenna an exact matching of the resonance frequency of the antenna to the working frequency of the detector plate and reader unit can be undertaken in a simple manner via its design, in particular its length and shape, so that the antenna can radiate with the maximum possible efficiency.

The electrical antenna can be arranged in or on the card data storage device itself.

The detector plate on the card data storage device thus obtains an increased reading range and can be read in the far field with a magnetic or electrical reader antenna. Moreover the coupling loop of the detector plate forms an independent magnetic antenna, which can be read in the near field with a magnetic reader antenna.

The electrical antenna can be an element of a detector plate antenna for the LF or HF band.

In this manner it is possible without additional work or expenditure to increase the reading range of a detector plate arranged on the card data storage device for the VHF band.

The electrical antenna can also be arranged in or on a storage cover or holder for the card data storage device.

The card data storage device with the detector plate by itself has only a short reading range. By inserting the card data storage device into the storage cover or holder the coupling loop on the card data storage device is coupled with the electrical antenna in or on the storage cover or holder, and thereby a significantly longer reading range is achieved. At the same time the card data storage device is then held and stored in a defined manner, and in addition is mechanically protected. As a result of the defined mounting a stable reading connection with a reader unit is also guaranteed, which is then advantageous if via the presence of the card data storage device operating functions of a unit or a machine are to be activated, and/or a vehicle is to be identified and a gate opened.

Alternatively the amplifier antenna can be designed as a slot antenna.

In a similar manner to an electrical antenna with a slot antenna an exact matching of the resonance frequency of the antenna to the working frequency of the detector plate and reader unit can be undertaken in a simple manner via its design, in particular its length and shape, so that the antenna can radiate with the maximum possible efficiency.

Since with a slot antenna the magnetic components of the electromagnetic field prevail in the near field, the radiation characteristics are to a large extent insensitive to damping as a result of adjacent electrical screening, such as is represented by electrically conducting objects, but also by the human body. With the use of a slot antenna the card data storage device can thus also be worn directly on the body of a user.

The slot of the slot antenna can be formed in an electrically conducting region of the card data storage device itself.

In this manner the card data storage device itself can form a slot antenna with the near field advantages as described.

The slot of the slot antenna can also be arranged in an electrically conducting region of the storage cover or holder for the card data storage device.

In an analogous manner to the electrical antenna in or on the storage cover or holder the card data storage device with the detector plate by itself then has only a short reading range. By inserting the card data storage device into the storage cover or holder the coupling loop on the card data storage device is coupled with the slot antenna in or on the storage cover or holder, and thereby a significantly longer reading range is achieved. At the same time the card data storage device is then held and stored in a defined manner and in addition is mechanically protected. As a result of the defined mounting a stable reading connection with a reader unit is also guaranteed, which is then advantageous if via the presence of the card data storage device operating functions of a unit or a machine are to be activated, and/or an authorised vehicle is to be identified and a gate opened.

A further advantage consists in the fact that the storage cover or holder consists of metal, partially or completely, and thus can also protect the card data storage device in heavy-duty environments. Such environmental conditions include e.g. sparks flying in the foundry, or during welding and cutting tasks, as well as the mechanical abrasion occurring during grinding and sand blasting tasks. Furthermore the storage cover or holder can also be attached directly on or to a metallic object, or by means of an appropriate shaping of the metallic object can also be formed by the latter itself.

In accordance with a further development with the existence of a further detector plate the user data stored in the chip of the respective detector plate can be identical.

In this manner existing card data storage devices can both be read and evaluated in accordance with their original purpose, and in addition can also be evaluated in another frequency band by means of a supplementary reader unit using identical data.

Furthermore a chip identifier can in addition be stored in the chip of the respective detector plate.

In this manner, despite the fact that the user data are the same, a differentiation can be made as to which detector plate the user data that have been read originate from.

Also with the existence of a further detector plate the user data stored in the chip of the respective detector plate can be identical, but can be coded by means of the data contents of the other chip in each case.

While here a separated reading of the user data in coded form is possible, but decoding requires the data contents of the other chip in each case. This variant has the advantage that only complete card data storage devices can be evaluated and so any manipulation, e.g. in the form of detachment of a detector plate that has been adhesively bonded on later, can be detected.

As a cost-effective modification of the invention the card insert can be fitted with an interposer, which at the same time contains a VHF coupling loop, which is completed by the positioning of a VHF chip relative to a VHF detector plate. In this manner both an HF and also a VHF detector plate are created in one task.

Furthermore it is possible to create a VHF coupling loop at the same time as the HF antenna is being manufactured, since to create the conductor structures the original support material must be etched away anyway. The insert thus created can now be made up as a card insert with an interposer as required as an HF detector plate, or by composing a VHF chip can be made up as a VHF detector plate, or by both actions can be made up as HF and VHF detector plates.

With the card data storage device according to the invention a large number of possible combinations of the various antennae and thus reading ranges ensue. A card data storage device with the described detector plate, independently of whether an amplifier antenna is coupled with the coupling loop or not, always possesses an independent magnetic antenna by means of the coupling loop of the detector plate, which antenna can be read in the near field with a magnetic reader antenna. Electrically conducting objects or screening bodies located in the vicinity have only a slight, practically negligible, damping effect. Thus a reader contact in the near field is guaranteed with a magnetic reader antenna under practical conditions. The short reading range that is linked with this has the advantage that influences of neighbouring card data storage devices are slight and reader units either manage without anti-collision methods, or that in the event that an anti-collision method is used only a few collisions need to be taken into account and that only a short time is required for a secure read process.

A card data storage device with the detector plate described and an integrated amplifier antenna can be read in the far field with a magnetic or electrical reader antenna and achieves a longer reading range.

A data storage device with the detector plate described and an amplifier antenna in or on a storage cover or holder achieves a maximum reading range in the far field, as can also be achieved using standard VHF detector plates.

Figure 2:
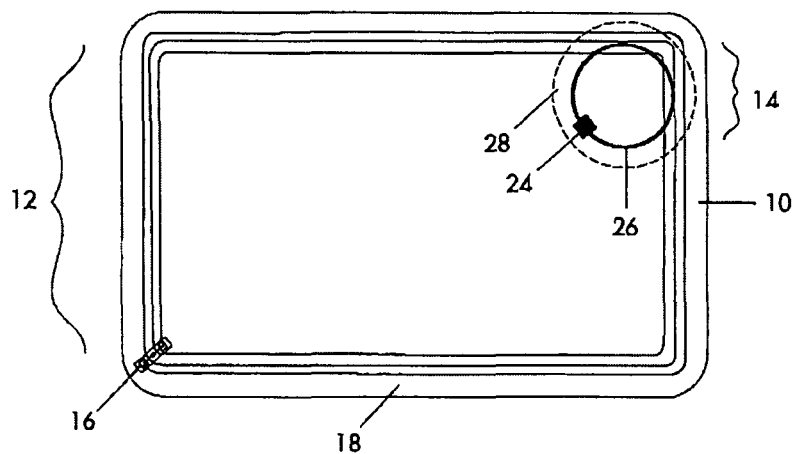
Figure 3:
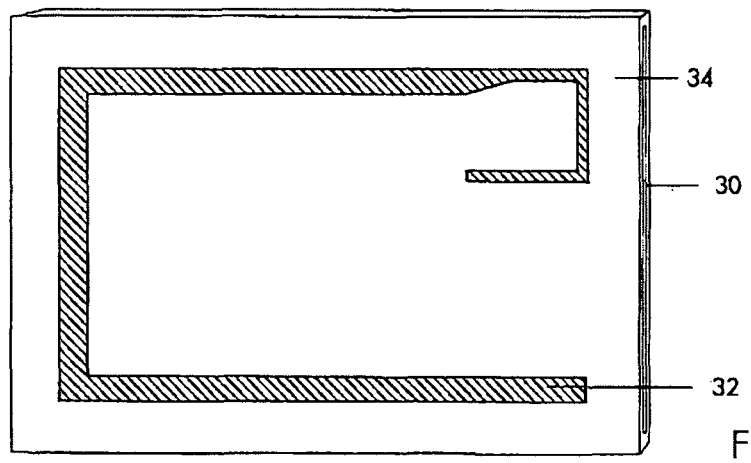
Figure 4:
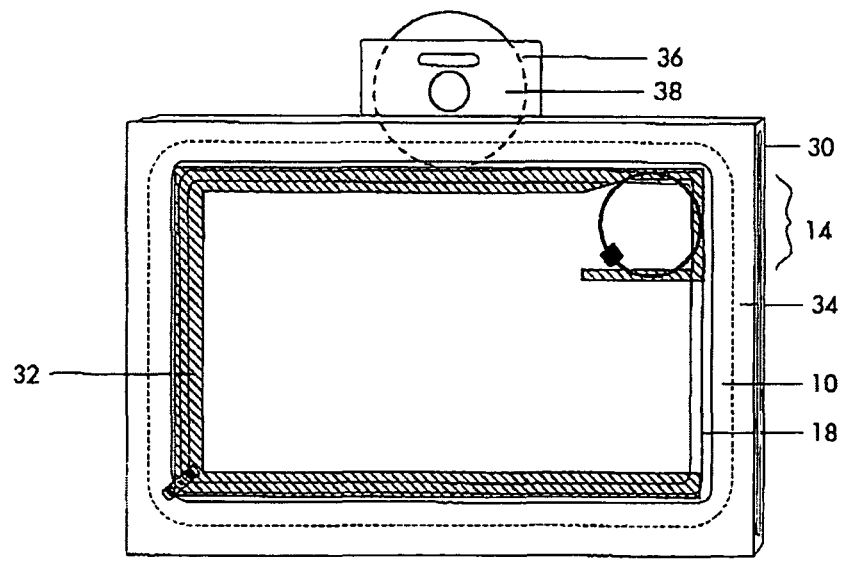
Figure 5:
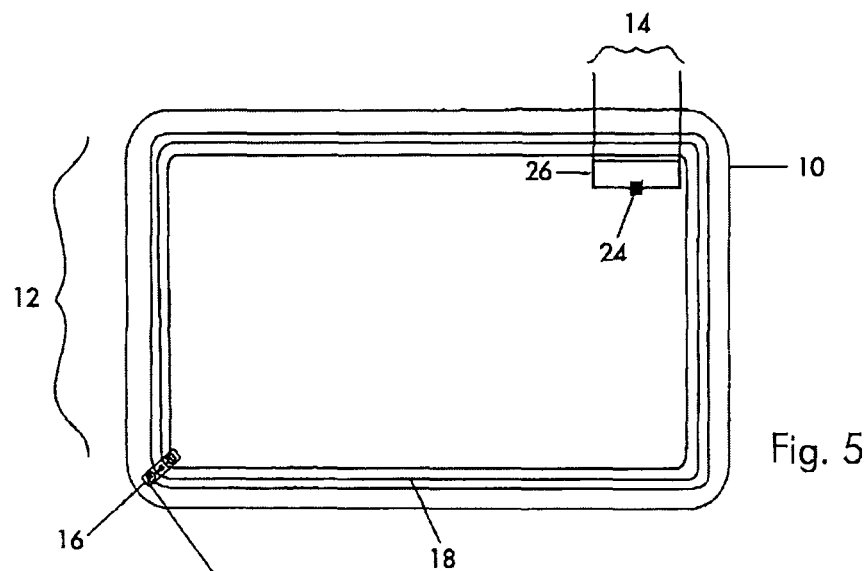
Figure 6A:
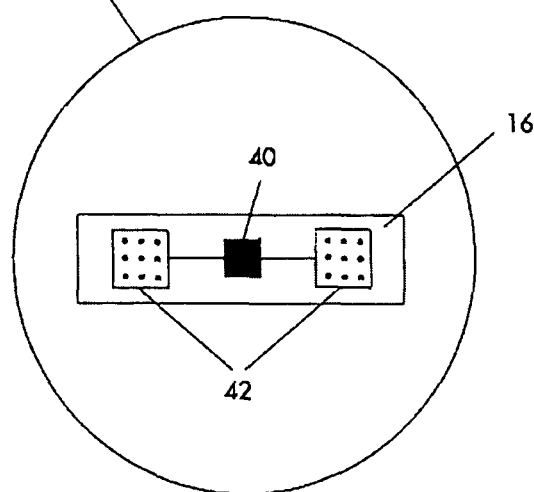
Figure 6B:
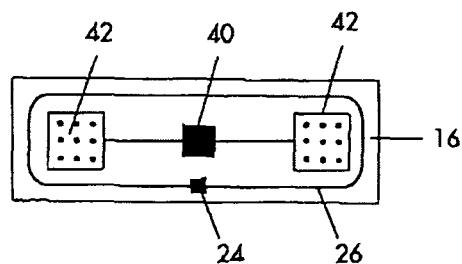

In what follows the invention is elucidated with the aid of examples of embodiment that are represented in the drawing. In the drawing:

FIG. 1 shows a card data storage device with two detector plates, of which one is dimensioned for the VHF band and is coupled with an integrated slot antenna, FIG. 2 shows a card data storage device with two detector plates, of which one is dimensioned for the VHF band, is adhesively bonded by means of a film, and its coupling loop is coupled with an existing HF antenna, FIG. 3 shows a storage cover with an electrical antenna, FIG. 4 shows a storage cover with an electrical antenna according to FIG. 3 and a card data storage device according to FIG. 2 inserted into the storage cover, FIG. 5 shows a card data storage device with two detector plates, of which one is dimensioned for the VHF band, is integrally arranged in the card insert, and its coupling loop is coupled with an existing HF antenna, FIG. 6*a* shows an interposer with a chip and connections for an HF antenna, and FIG. 6*b* shows an interposer according to FIG. 6*a*, but in addition with a chip and a coupling loop for the VHF band.

FIG. 1 shows a card data storage device 10 with two detector plates 12, 14. A first detector plate 12 is dimensioned for the HF band and includes an interposer 16, on which a chip with antenna connections is arranged. A detailed illustration is shown in FIG. 6*a* and elucidated. The antenna connections are linked with an antenna loop 18, which is arranged in the edge region of the card data storage device 10. A second detector plate 14 is dimensioned for the VHF band and includes a chip with an inductive coupling loop. The detector plate 14 is inductively coupled with a slot 22 of a slot antenna, which is arranged in a conducting region 20 in or on the card data storage device 10. Detector plate 14 and slot antenna can lie jointly or separately as an insert between the outer layers of the card data storage device 10, or can be adhesively bonded later onto an existing card data storage device 10. Alternatively it is also possible that the slot antenna is arranged as an insert and the detector plate 14 is arranged on the surface, or vice versa. The two detector plates 12, 14 are spatially positioned separated so far from one another that no mutually disturbing influence occurs.

FIG. 2 likewise shows a card data storage device 10 with two detector plates 12, 14. A first detector plate 12 corresponds to that from FIG. 1. A second detector plate 14 for the VHF band consists of a chip 24 and a coupling loop 26 linked with the chip 24. The chip 24 with the coupling loop 26 is located on a plastic film 28 that is adhesively bonded to the card data storage device near the corner of the card data storage device 10 opposite to the interposer 16 of the first detector plate 12. Here the coupling loop 26 is coupled with the antenna 18 of the first detector plate and uses this as an amplifier antenna. In order to achieve optimal coupling the second detector plate 14 is advantageously positioned by means of a template at a previously determined location and is then adhesively bonded on.

The coupling loop 26 for its part forms a small magnetic antenna for the magnetic components of an electromagnetic field and is only insignificantly influenced in its radiation characteristics by surrounding conducting elements. The coupling loop 26 can therefore be directly coupled with a magnetic reader antenna in the near field, or via the low resistance coupling region of the passive amplifier antenna can be coupled with this amplifier antenna and can be read in the far field with a magnetic or electrical reader antenna.

FIG. 3 shows a storage cover 30 with an electrical antenna in the form of an asymmetric radiator 32 with a coupling region 34 at its foot. This radiator 32 runs around the edge of the storage cover 30 and extends over three edges, wherein it bends at each of the corners.

FIG. 4 shows a storage cover 30 with an electrical antenna 32 according to FIG. 3 as an amplifier antenna, and a card data storage device 10 inserted into the storage cover 30 in accordance with FIG. 2. In the inserted position the coupling loop 26 accesses the coupling region 34 of the electrical antenna 32 on the storage cover 30 and thus is coupled with the electrical antenna. The electrical antenna 32 on the storage cover runs parallel to the antenna loop 18 of the first detector plate 12.

In this manner any detuning of the electrical antenna 32 on the storage cover is to a large extent avoided, so that approximately the same matching conditions between the coupling loop 26 and the electrical antenna 34 on the storage cover 30 can be achieved with or without the existence of the antenna loop 18 of the first detector plate 12. The storage cover 30 makes use of a slot 36 for the introduction of a support clip and/or a suction cup 38 for stationary attachment, in particular to the windscreen of a vehicle.

FIG. 5 shows a card data storage device 10 with two detector plates 12, 14, of which one is dimensioned for the VHF band, is integrally arranged in the card insert, and its coupling loop 26 is coupled with an existing HF antenna 18. In the integral embodiment an optimal coupling is specified between the coupling loop 26 and the antenna loop 18 through a common layout with the antenna loop 18 of the first detector plate 12. Manufacture does not any generate any extra costs, since to create the conductor structure the original support material must be etched away anyway.

FIG. 6a shows an interposer 16 with a chip 40 and connections 42 for an HF antenna. The interposer 16 is preferably arranged in a corner of the card data storage device 10 and in contact with the antenna loop 18, since the lowest bending load on the card data storage device 10 occurs there, and thus the chip 40 and also the connections 42 are optimally protected against bending loads and any damage that may occur as a result.

FIG. 6b shows an interposer according to FIG. 6a, but with the addition of a chip 24 and a coupling loop 26 for the VHF band. For the reasons already cited in connection with FIG. 5 manufacture once again does not generate any extra costs.

The embodiment according to the invention enables the following applications.

Card data storage devices with detector plates consisting of a chip and a coupling loop linked with the chip without an amplifier antenna possess only a short reading range and therefore there can be no eavesdropping on their stored data by means of remote read-out. The reading range can however be increased in conjunction with a storage cover and an amplifier antenna arranged on or in the storage cover.

The storage cover with the amplifier antenna can remain at the site where it is being used, e.g. with a person, on an item of equipment, a machine, or a vehicle, there by means of the inserted card data storage device to activate operating functions in the far field, and to hold and store the card data storage device itself. At the same time the storage cover also serves as a positioning aid for the coupling of the card-side coupling loop with the cover-side amplifier antenna.

Through the read-out capability in the far field the storage cover can be configured to be purely passive, while an active reader antenna can be relocated, and thus can be arranged to be largely inaccessible to manipulation or damage. A secure transfer of data is nevertheless guaranteed.

The invention claimed is:

1. A card data carrier comprising:
a first HF detection plate, consisting of an interposer having a chip with antenna connections, and of an antenna loop mechanically connected with the antenna connections, wherein the antenna loop is the sole coil of the HF detection plate;
a second detection plate composed of a chip and an antenna arrangement coupled with the chip, said antenna arrangement comprising an inductive coupling loop which is connected with connectors of the chip, and which completely or partially encloses a region of the data carrier that is not electrically conductive,
wherein said second detection plate is a UHF detection plate, wherein the antenna arrangement of the second detection plate that is coupled with the chip additionally comprises an amplifier antenna that is configured as an electrical antenna and increases the reading range in the remote field, wherein the coupling loop is inductively coupled with said amplifier antenna, and
wherein the electrical antenna forms a component of an antenna of a detection plate for the LF or HF range, or is disposed in or on a storage sheath or holder of the card data carrier,
wherein the electrical conductor of the electrical antenna has a course with at least one 90° deflection angle in which the coupling loop of the second detection plate is located.

2. The card data carrier according to claim 1, wherein the electrical antenna is disposed in or on the card data carrier itself.

* * * * *